A. KRABER.
Grain-Drill.

No. 9,151                              Patented July 27. 1852.

UNITED STATES PATENT OFFICE.

ADAM KRABER, OF YORK, PENNSYLVANIA.

IMPROVEMENT IN SEED-PLANTERS.

Specification forming part of Letters Patent No. 9,151, dated July 27, 1852.

*To all whom it may concern:*

Be it known that I, ADAM KRABER, of the city and county of York and State of Pennsylvania, have invented certain new and useful Improvement in Machines for Planting or Drilling Grain and Cultivating the Soil; and I do hereby declare that the following is a full, clear, and exact description of my said invention, reference being had to the accompanying drawings, which form part of this specification, and in which—

Figure 1:
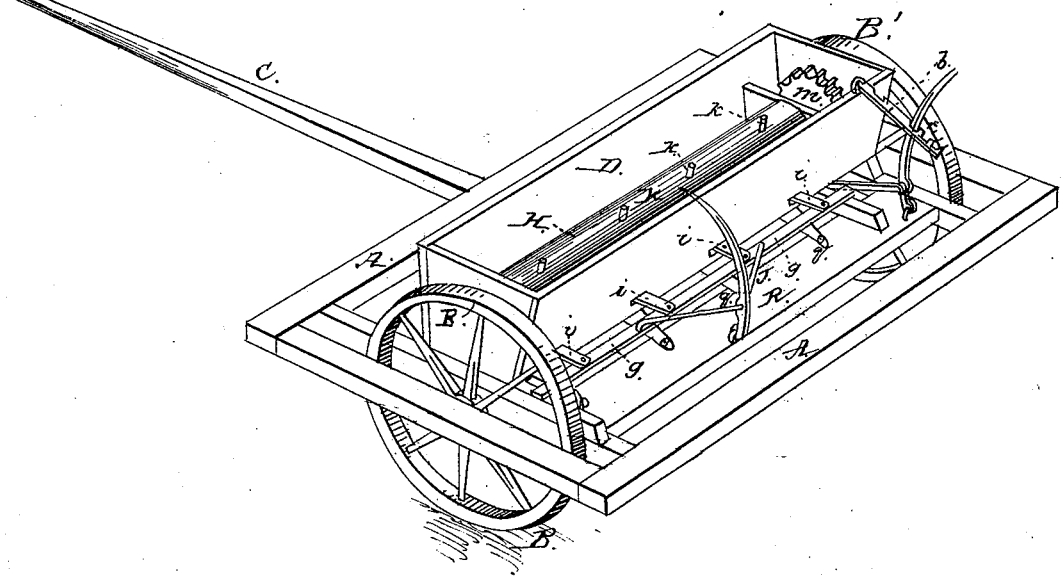
Figure 2:
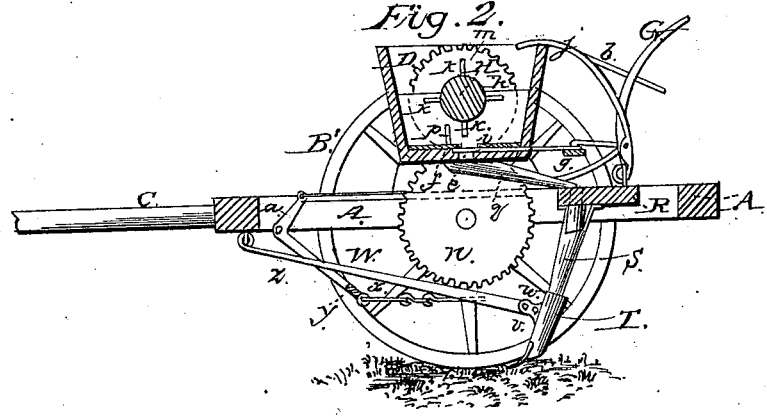
Figure 3:
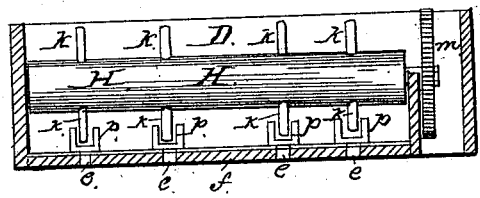

Figure 1 represents a view in perspective of my improved grain-drill. Fig. 2 is a vertical transverse section thereof, and Fig. 3 is a longitudinal section of the hopper and agitating-roller.

My invention consists, first, in agitating the grain and other substances in the hopper and breaking up the lumps thereof at the orifice through which the grain is discharged by means of a series of rotating teeth, acting in connection with a series of stationary combs secured to the bottom of the hopper.

The second part of my invention consists in arranging a series of shares upon a corresponding series of beams or draft-bars hinged at their front ends to the main frame, which is mounted at a fixed distance from the ground upon wheels, and at the rear end, or near there, connected by links with a transverse bar placed beneath them, arranged so that it can be adjusted at a variable height to raise and lower the shares and hold them in the ground at any required gage or depth of furrow without varying the height of the frame, so that in case one of the teeth should encounter a streak of hard clay while the rest are running in softer and more pulverulent material the wheels would prevent the shares running in the soft earth from penetrating too deep, while the share running in the hard ground would have its tendency to run out counteracted by the weight of the whole machine acting upon it through the link which connects its beam with the adjustable cross-bar.

My machine, as represented in the accompanying drawings, consists mainly of a carriage-frame supported upon two running-wheels of a hopper with its agitating apparatus, and of a series of shares and their appendages for the purpose of forming the furrows and depositing the seed therein. The carriage-frame A is rectangular, and is fitted at its front with a tongue, C, to which the horses are attached. It is mounted upon two running wheels, B B', each of which is secured to a separate axle that turns in suitable boxes secured to the frame-work of the carriage. The hopper D extends across the frame between the wheels, and is mounted upon the cross-bars of the carriage-frame. Its bottom *f* is pierced with a series of apertures, *e*, corresponding in number and position with the shares. Each of these apertures is fitted with a sliding valve or register, *i*, by which the size of the opening, and consequently the quantity of seed discharged, is regulated. The shanks of the whole series of valves extend backward behind the hopper, and are attached to a bar, *g*, which is connected with a lever, *j*, by moving which the opening or closing of all the apertures is effected simultaneously.

The hopper is fitted with a roller, H, which extends throughout its entire length, and is studded with teeth *k*. One of the gudgeons of this roller has a cog-wheel, *m*, secured to it, whose teeth engage with those of a corresponding cog-wheel, *n*, secured to the shaft of one of the running wheels, B', of the carriage, so that as the machine is drawn over the ground the other is caused to revolve. A comb, *p*, is secured to the bottom of the hopper near each aperture, and in such a position with respect to the teeth of the roller that the latter in revolving pass between those of the combs.

Each aperture in the bottom of the hopper is fitted with a tube, *q*, which conducts the seed backward and downward to an aperture in a plate, R, secured to the hinder part of the carriage-frame. Each of these latter apertures is also fitted with a tube, *s*, which delivers the grain into the hollow shanks of the shares beneath. The shares T in the present machine are four in number. Each is fitted at its front side with ears *u*, by which it is connected with a hinder extremity of a draft-bar, W, whose front end is hinged to the front rail of the carriage. In order to prevent the shares from turning upon the pivots which connect them with their appropriate draft-bars, the ears of each share are pierced with a second set of holes behind the pivot, and a corresponding hole is formed in the hinder extremity of the draft-bar to admit a wooden pin, *v*, which, when the share is passing through earth, holds it in its proper upright position, but which breaks when the shares strike an obstacle whose displacement requires the exertion of a greater amount of force than the machine is capable of withstanding, and permits the share to turn backward upon its pivot and pass over the obstacle.

Each draft-bar W is connected by a link or chain, $x$, with a horizontal bar, Y, which passes crosswise beneath the whole series of draft-bars, and is secured at its extremities to a pair of parallel arms, $z$, which project from gudgeons that turn in boxes secured to the cross-bars of the carriage. One of these gudgeons has a second shorter arm, $a$, secured to it, whose outer extremity is connected by a rod with a lever, G, upon the hinder part of the carriage, so that by forcing the upper arm of the lever forward the horizontal bar is drawn upward beneath the whole series of draft-bars to raise them simultaneously, and thus raise the whole series of shares from the ground, while by drawing the lever G backward the horizontal bar is depressed to permit the whole series of draft-bars to descend simultaneously until their respective shares touch the surface of the ground, after which the continued movement of the lever will tighten the chains $x$ $x$ and force the points of the whole series of shares to enter the soil to the requisite depth. The lever may be secured in a proper position, either to hold the shares in their raised position or to keep them running in the soil at any required depth, by means of a ratchet-bar, $b$, which is hinged to the back of the hopper.

This machine is particularly adapted to the planting of grain that has been prepared by soaking, or of mixtures of grain and manure, which tend to agglomerate and choke the orifices of the hopper, for when the machine is in operation the teeth of the cylinder in the hopper are continually revolving between those of the combs and above the orifices in the bottom of the hopper, and consequently the lumps of grain or of grain and manure are broken up, and thus fitted to pass through the orifices, while at the same time the orifices themselves are kept clear for the passage of the grain.

The apparatus I have described for holding the shares at their proper depths in the soil is of great importance, for it insures the thorough breaking up of the soil and the planting of the grain at a proper depth. In most cultivators and grain-drilling machines heretofore constructed the shares are held at their proper depth merely by their own weight and that of the draft-bar, or by the tension of a spring, which is not sufficient to prevent them from rising when one of them comes in contact with hard soil, which, although not presenting sufficient obstruction to cause a breakage or stoppage of the machine, nevertheless raises the share, and thus causes the deposit of the seed too near the surface. In my machine, on the contrary, the shares are maintained at an invariable distance below the tracks of the wheels by the action of the horizontal bar Y and its chains, unless they meet with an obstacle whose removal requires the expenditure of a greater force than the machine is capable of withstanding, when the breaking pin gives way and allows the share to turn backward and pass over the obstacle. Hard soil or small obstructions therefore do not affect the regular deposit of the seed at a uniform depth, but are penetrated or turned aside by the shares, which therefore plant at the same invariable depth, whether the soil is of regular or irregular density or hardness. When a breaking pin has given way the share should be restored to its proper position and a new pin should be inserted instead of the broken one. A stock of breaking pins should therefore be kept on hand, and may be carried in a basket or box attached to the frame of the carriage.

The implement thus described is well adapted to pulverizing the soil before and after planting, as well as to planting; and the method of holding the teeth down is applicable to all wheel-cultivators and will be found greatly to increase their efficiency.

What I claim as my invention, and desire to secure by Letters Patent, is—

1. The combination of a series of stationary combs, secured to the bottom of the hopper near the orifices through which the grain is discharged, with a corresponding series of rotating teeth, secured to a cylinder or roller that revolves within the hopper, in the manner and for the purposes herein set forth.

2. The combination of the cross-bar Y and its links and levers with the draft-bars of the shares, whereby the whole series of shares can at will be raised and depressed while the machine is in motion, and the weight of the whole machine is brought to bear upon any tooth that may tend to run out in consequence of meeting with hard soil, while at the same time an even depth of furrow is maintained by the wheels and the weight of the frame taken off the shares, except when some one of them tends to run out, as herein set forth; but I make no claim to any arrangement of mechanism for holding the teeth or shares in the ground when the pressing-bar acts upon the teeth through the medium of springs.

In testimony whereof I have hereunto subscribed my name.

ADAM KRABER.

Witnesses:
JOHN CREMER,
PHILIP EICHILBERGER.